Oct. 25, 1932.   F. D. FUNSTON   1,883,895

SHOCK ABSORBER

Filed Oct. 19, 1931

Inventor
FREDERICK D. FUNSTON

By Spencer, Hardman and Fehr
Attorneys

Patented Oct. 25, 1932

1,883,895

UNITED STATES PATENT OFFICE

FREDERICK D. FUNSTON, OF DAYTON, OHIO, ASSIGNOR TO DELCO PRODUCTS CORPORATION, OF DAYTON, OHIO, A CORPORATION OF DELAWARE

SHOCK ABSORBER

Application filed October 19, 1931. Serial No. 569,704.

This invention relates to improvements in hydraulic shock absorbers.

It is among the objects of the present invention to provide a hydraulic shock absorber with a fluid flow control device capable of being adjusted manually or automatically, in accordance with temperature changes.

Further objects and advantages of the present invention will be apparent from the following description, reference being had to the accompanying drawing wherein a preferred embodiment of one form of the present invention is clearly shown.

Figure 1:
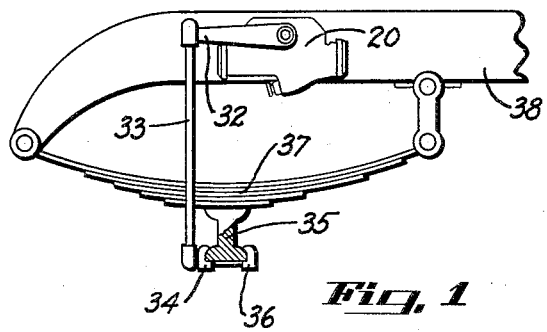
Fig. 1 is a fragmentary side view of a vehicle chassis having attached thereto a shock absorber equipped with the present invention.

Referring to the drawing, the shock absorber is shown comprising a casing 20 providing a fluid reservoir 21 and a cylinder 22. The ends of the cylinder are closed by cylinder head caps 23 and 24. Within the cylinder there is provided a piston 25 forming compression chambers 26 and 27, the former being termed the spring compression control chamber, the latter the spring rebound control chamber.

The piston operating arm or lever 30 is oscillatably supported upon a shaft 31 rotatably carried by the casing. One end of this shaft or rod 31 extends outside the shock absorber casing and has the operating arm 32 attached thereto, the free end of said arm being swivelly secured to one end of a link 33, the other end of said link being swivelly attached to a bracket 34 anchored to the vehicle axle 35 by a clamping member 36. The axle 35 supports vehicle springs 37, which in turn support the vehicle frame 38, as shown in Fig. 1.

The piston 25 within the cylinder 22 comprises two head portions 40 and 41, each having a passage for the transfer of fluid from one side of the head portion to the other, each piston in turn having fluid flow control mechanism whereby when the piston is moved in one direction, a substantially free flow of fluid will be directed from the piston to the reservoir into the compression chamber, while when the piston is moved in the opposite direction a restricted flow of fluid is established from the compression chamber into the reservoir upon a predetermined fluid pressure having been reached.

Inasmuch as the fluid flow control mechanism of each piston head is the same, only one will be described for the sake of brevity.

Figure 2:
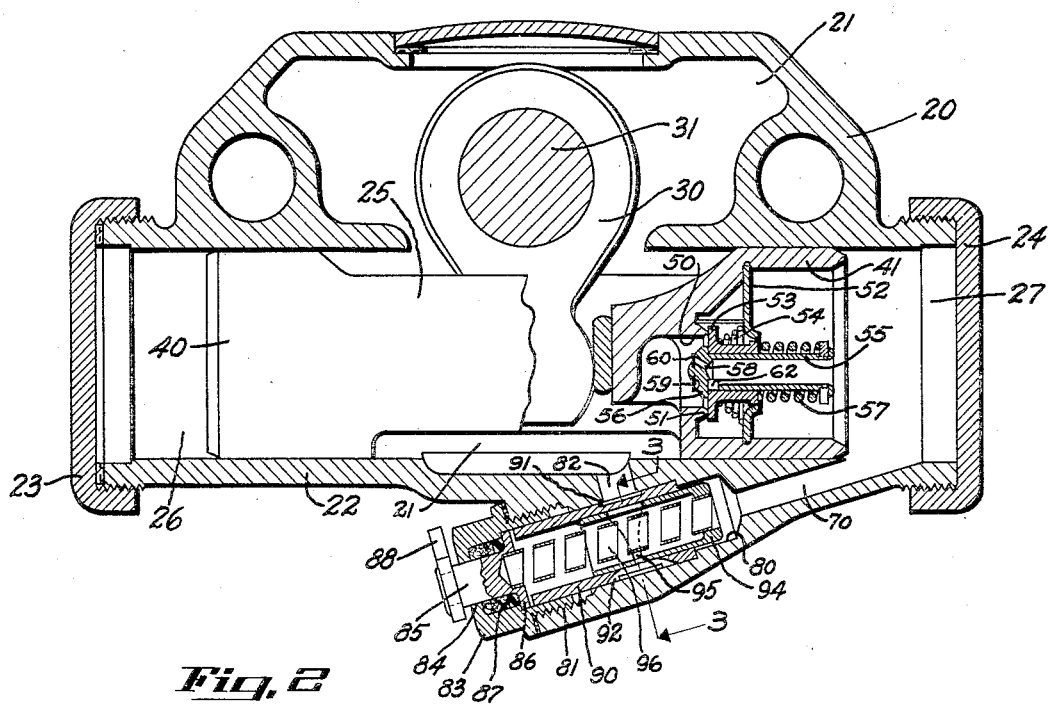
Fig. 2 is a sectional view taken longitudinally of the shock absorber, certain parts being shown in elevation for the sake of clearness.

Referring to the piston head portion 41 which is shown in Fig. 2, the numeral 50 designates the fluid passage therein about which there is provided an annular ridge forming a valve seat 51. A cage member 52 is secured within the piston in any suitable manner. The valve for establishing a substantially free flow of fluid from the reservoir 21 into the chamber 27 is designated by the numeral 53 and is urged into engagement with the valve seat 51 by the spring 54. The valve for establishing a restricted flow of fluid from the compression chamber into the reservoir in response to the movement of the piston in another direction, comprises a tubular member 55 slidably supported by the valve 53 and having a head portion 56 yieldably urged into engagement with the outer surface of the valve 53 by a spring 57. In the head 56 of the valve there is a through passage 58 leading to an annular groove 59 in the end surface of valve head 56. A spring disc 60, secured on the valve head 56 and centrally thereof in any suitable manner, yieldably closes the annular groove 59.

As the spring 37 is moved toward the frame 38, which is its compression movement, due to the road wheels of the vehicle striking an obstruction in the roadway, the link 33 and arm 32 will rotate shaft 31 and its arm or lever 30 clockwise as regards Figs. 1 and 2 and thus the piston 25 is moved toward the left. Fluid within the chamber 26 will have pressure exerted thereupon. Fluid from the reservoir 21 will, in response to this piston movement, urge valve 53 from its seat against the effect of spring 54 to establish a substantially free flow of fluid into the spring rebound control chamber 27.

The return of the vehicle spring 37 toward its normal load position causes the lever connections with arm 30 to move said arm counter-clockwise, thus to move the piston 25 to the right as regards Fig. 2. Now the fluid within the spring rebound control chamber 27 has pressure exerted thereupon which, having attained a proper degree, will be exerted through the valve 55, through its passage 58 in the head 56 to flex the disc 60 so as to establish a flow from passage 58, annular groove 59 into the reservoir 21. This flow being restricted will resist the movement of the piston toward the right and likewise the rebounding movement of the vehicle springs 37 will be resisted. Excessive fluid pressures in chamber 27 will move valve 55 bodily relatively to the valve 53 and thus there will be established a fluid flow through the opening 62 in the side of the valve 55 which opening normally is closed because it normally lies within the confines of the valve 53.

The present shock absorber is provided with means for by-passing fluid from the chamber 27 around the piston to the reservoir 21 thereby to establish a flow from said chamber to said reservoir before either one of the valves 60 or 55 establish their restricted flows. This by-pass comprises a duct 70 in the casing leading into a counterbore 80 which opens to the outside of the shock absorber. The outer end of this counterbore is interiorly threaded as at 81. A cross passage 82 provides communication between the counterbore portion 80 of duct 70 and the reservoir 21, as shown in Fig. 2. The threaded end of duct 70, or more particularly its counterbored portion, receives a recessed plug 83. The outer end of this plug has a central opening 84 through which extends the actuator 85 which has an annular flange 86 fitting within the recess of the plug 83. A suitable packing 87 is provided about the actuator 85 within the recessed plug 83 to prevent leaks at this point. A pointer 88 is provided on the actuator 85 to indicate the degree of manual adjustment of said actuator.

Figures 3, 4, 5:
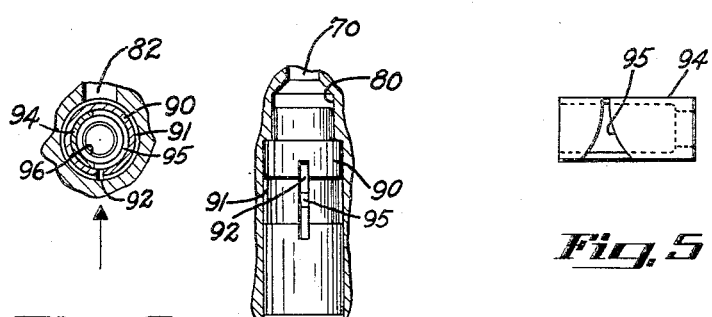
Fig. 3 is a detail sectional view taken substantially along the line 3—3 of Fig. 2.
Fig. 4 is a detail view of a portion of the fluid flow control device.
Fig. 5 is a view showing the shape of the orifice in the adjustable fluid flow control valve.

Within the counterbored portion 80 of the duct 70 there is press-fitted a sleeve 90, having an annular groove 91 so located that it will communicate with cross passage 82 when the sleeve 90 is in position in the duct 70. A comparatively narrow, longitudinal slot 92 is cut through the wall of the sleeve 90 to provide communication between the annular groove 91 and the interior of the sleeve 90. A valve 94, of tubular construction, is rotatably carried within the sleeve 90. As shown in Fig. 5, this valve has a tapering slot 95 cut therein, one end of the slot being of greater width than the other. This slot extends transversely of the slot 92 in the sleeve 90 whereby, upon rotation of the valve 94 relative to the sleeve, the cross sectional area of slot 95 communicating with slot 92 may be varied. This valve arrangement is not affected by fluid pressure inasmuch as variations in the orifice are obtainable only by turning valve 94.

A bi-metallic strip 96, shown to be wound helically has its one end anchored to the actuator member 85, the opposite end being anchored to the valve 94. This helically wound piece of bi-metal provides not only a mechanical connection between the actuator 85 and the valve 94 whereby the valve 94 will be caused to rotate with the actuator 85 when it is turned for adjustment purposes, but it also provides an automatic means for adjusting the valve 94 so that said valve is rotated in response to, and in accordance with, variations in temperature of the fluid passing through the duct 70. It will, of course, be understood that the bi-metal member 96 acts automatically independent of the operation of the actuator 85.

As the piston head portion 41 moves to exert pressure upon the fluid within the spring rebound control chamber 27, the fluid will be caused to flow through duct 70, through the valve 94 and its transverse slot 95, thence through the longitudinal slot 92 in sleeve 90, into the annular groove, thence through cross passage 82 into the reservoir 21. If the operator finds that this flow of fluid is not sufficiently restricted, that is if the restriction to the flow of fluid is such that too free a ride is permitted by the shock absorbers, then the actuator 85 is turned, causing the bi-metal strip 96 now acting as a mechanical connection, to turn valve 94 so that a narrower portion of its slot 95 is brought into communication with the longitudinal slot 92 of the sleeve 90. If, on the other hand, the shock absorbers too greatly resist spring or body movements and thereby provide too stiff a ride, then the actuator 84 is operated to rotate the valve so that a wider portion of its slot 95 is presented to the longitudinal slot 92 of sleeve 90 whereby the fluid flow through duct 70 will be restricted at a lesser degree and consequently the shock absorbers will offer a softer ride by decreasingly resisting spring and body movements.

If the temperature of the fluid within the shock absorber is substantially reduced, thereby causing the viscosity of the oil to increase, due to which restriction to the fluid flow in the by-pass duct 70 is increased excessively, the bi-metal strip 96 will, in response to such lower temperature of fluid, operate to rotate valve 94 so that a wider portion of its transverse passage 95 will be presented to the longitudinal slot 92 of sleeve 90, whereby to reduce the restriction to the fluid flow and thereby automatically adjust the shock absorber to compensate for the increased viscosity of its fluid. The reverse is true if the viscosity of the fluid is suddenly decreased, under which condition the bi-metal strip 96 will operate to increase fluid flow restriction through the slots 95 and 92, respectively.

In the present invention applicant has provided a shock absorber adapted to be adjusted manually and automatically to vary its characteristics, a common member being provided which, for manual adjustment acts as a mechanical connection, but which is adapted to act automatically to obtain the proper adjustments of the fluid flow control device in accordance with temperature changes and irrespective of pressures.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a fluid reservoir and a cylinder; a piston in said cylinder forming a compression chamber therein; a piston operating member; a duct in the casing connecting the compression chamber with the fluid reservoir; a valve in said duct comprising two telescopically engaging tubular members, one of which is stationary the other rotatable relatively to said stationary member, both members having openings adapted to align; an actuator in said duct, extending outside the casing; and a thermostatic element connected to the actuator and the rotary valve member, said element being adapted automatically to rotate the valve in response to temperature changes to disalign the holes in the valve members and thus vary the flow of fluid through the duct in accordance with said temperature changes, said thermostatic element being adapted also to adjust the valve in response to adjustments of the actuator.

2. A shock absorber comprising, in combination, a casing providing a fluid reservoir and cylinder; a piston in said cylinder forming a compression chamber therein; a piston operating member; a valve adapted to establish a restricted flow of fluid from the compression chamber into the reservoir in response to movements of the piston in one direction, said valve comprising two telescopically engaging tubular members having normally aligned openings, one member being stationary the other being rotatably supported thereby; an actuator accessible from outside the shock absorber and manually operable to adjust the rotary valve member for varying the restriction to the flow of fluid; and a temperature responsive member connected between the actuator and the rotary valve member for transmitting motion from the actuator to the rotary valve member and adapted automatically to adjust said valve member in response to and in accordance with temperature changes.

3. A shock absorber comprising, in combination, a casing providing a fluid reservoir and a cylinder in which a fluid compression chamber is formed by a reciprocative piston; a duct providing for the escape of fluid from said chamber; a rotary valve in said duct for restricting the flow of fluid therethrough; a manually operable actuator; and a bi-metallic member providing an operative connection between the actuator and valve for rotating said valve in response to operation of the actuator and also for rotating said valve in response to and in accordance with temperature changes, independently of the operation of the actuator.

4. In a hydraulic shock absorber of the piston and cylinder type, the combination with a fluid compression chamber therein; a fluid exhaust duct; a sleeve in said duct having a port therein; a rotary valve in said sleeve cooperating with the port to restrict the flow of fluid through the duct; a manually operable valve adjusting member; and a temperature responsive element operatively connecting the said member with the valve so that said valve is rotatable with said member said element, however, being adapted automatically to rotate the valve in response to and in accordance with temperature changes independently of the operation of the manually operable member.

5. A shock absorber comprising, in combination, a casing providing a fluid reservoir and a cylinder; a piston in said cylinder forming a compression chamber therein; a piston operating member; a duct in the casing leading from the compression chamber to the outside of the casing, said duct having a counter-bored portion interiorly threaded at the outer end; a cross passage connecting the duct and fluid reservoir; a recessed plug in the threaded end of the duct, said plug having a central opening; a sleeve fitting snugly into the counter-bored portion of the duct and extending into the recess of the plug, said sleeve having an outer, annular groove aligning with the cross passage and a comparatively narrow, longitudinal slot providing communication between the annular groove and the interior of said sleeve; a tubular valve rotatably supported within the sleeve, said valve having a tapering transverse slot registering with the longitudinal slot in the sleeve; an actuator extending through the central opening in the screw plug into the recess therein; a packing in the recess of the plug about the actuator; and a temperature responsive element secured at one end to the actuator and at the other end to the tubular valve and adapted to rotate said valve relative to the sleeve when the actuator is rotated, and also adapted automatically to rotate said valve in response to and in accordance with the temperature variations of the fluid within the casing.

6. A shock absorber comprising, in combination, a casing providing a fluid reservoir and a cylinder; a piston in said cylinder forming a compression chamber therein; a piston operating member; a duct in the casing leading from the compression chamber to the outside of the casing, said duct having a counter-bored portion interiorly threaded at the outer end; a cross passage connecting the duct and fluid reservoir; a recessed plug in the threaded end of the duct, said plug having a central opening; a sleeve fitting snugly into the counter-bored portion of the duct and extending into the recess of the plug said sleeve having an outer, annular groove aligning with the cross passage and a comparatively narrow, longitudinal slot providing communication between the annular groove and the interior of said sleeve; a tubular valve rotatably supported within the sleeve said valve having a tapering transverse slot registering with the longitudinal slot in the sleeve; an actuator extending through the central opening in the screw plug into the recess therein; a packing in the recess of the plug about the actuator; and a helically wound strip of bi-metal attached to the actuator at one end and to the tubular valve at the opposite end and providing a mechanical connection between the valve and actuator so the rotation of the latter will be transmitted to the valve, said bi-metal strip exerting a twisting effort upon the valve to turn it in response to and in accordance with varying temperatures of the fluid in the duct, independently of rotation of the actuator.

7. In a hydraulic shock absorber having a casing providing a fluid reservoir and a cylinder in which a piston forms a compression chamber the combination with a duct leading from the said chamber to the outside of the shock absorber; a cross passage connecting the duct with the fluid reservoir; a recessed plug secured in the outer end of the duct and having a central opening; a sleeve press fitted into the duct said sleeve having a slot through its wall in communication with the cross passage; a tubular valve rotatably carried in said sleeve and having a slot transversely of the slot in the sleeve with which it communicates, one of said slots being comparatively narrow, the other varying in width; an actuator extending through the opening in the plug into the recess therein; a packing in said recessed plug around the actuator; and a helically wound, bi-metal strip attached at one end to the actuator and at the other end to the valve, forming a mechanical connection between said actuator and valve to turn the valve by rotation of the actuator and also to turn the valve in response to and in accordance with fluid temperatures independently of actuator adjustments.

In testimony whereof I hereto affix my signature.

FREDERICK D. FUNSTON.